United States Patent [19]

Chou et al.

[11] Patent Number: 5,705,554
[45] Date of Patent: Jan. 6, 1998

[54] HEAT RESISTANT COATING COMPOSITION

[75] Inventors: Ti Chou; James Stanley Dodge, both of Bay Village; George Kletecka, Fairview Park, all of Ohio

[73] Assignee: The B.F. Goodrich Company, Akron, Ohio

[21] Appl. No.: 499,834

[22] Filed: Jul. 10, 1995

Related U.S. Application Data

[63] Continuation of Ser. No. 217,995, Mar. 25, 1994, abandoned.

[51] Int. Cl.⁶ .................................................. C08F 2/16
[52] U.S. Cl. ........................ 524/460; 524/458; 524/517; 524/521; 524/522; 524/523; 524/524; 524/525; 524/515; 524/527
[58] Field of Search ........................... 524/458, 460, 524/517, 522, 523, 521, 515, 524, 525, 527

[56] References Cited

U.S. PATENT DOCUMENTS

| | | | |
|---|---|---|---|
| 4,151,143 | 4/1979 | Blank et al. | 524/460 |
| 4,598,118 | 7/1986 | Hansen et al. | 524/517 |
| 4,616,057 | 10/1986 | Lindemann et al. | 524/458 |
| 4,952,623 | 8/1990 | Auchter et al. | 524/517 |
| 4,954,558 | 9/1990 | Tsaur | 524/460 |
| 5,356,956 | 10/1994 | Uemae et al. | 524/460 X |
| 5,385,967 | 1/1995 | Bauer et al. | 524/460 X |
| 5,405,879 | 4/1995 | Uemae et al. | 524/460 X |

*Primary Examiner*—Judy M. Reddick
*Attorney, Agent, or Firm*—George W. Moxon, II

[57] ABSTRACT

A coating composition for use as an overcoat or heat resistant coating having improved heat resistance comprised of an aqueous latex polymer emulsion and a water soluble or water-dispersible resin which containing a sufficient number of either (a) carboxyl groups or (b) carboxyl and amide groups which will form at least one anhydride ring or imide, in the presence of sufficient heat, and release water molecules, with the latex polymer having a particle size of less than about 1600 Angstroms and containing an effective amount of a nitrogen containing volatile base to achieve a pH of greater than about 7.5 to keep the resin solubilized or dispersed.

8 Claims, No Drawings

HEAT RESISTANT COATING COMPOSITION

This is a continuation of application Ser. No. 08/217,995 filed Mar. 25, 1994, now abandoned.

BACKGROUND OF THE INVENTION

This invention relates to a heat resistant coating composition comprising a water soluble or water-dispersible resin which contains a sufficient number of either carboxyl groups or carboxyl and amide groups which will form anhydride rings or imides, in the presence of heat and a latex polymer emulsion, where the polymer has a particle size of less than 1600 Angstroms, and where the overall aqueous system contains an effective mount of nitrogen-containing volatile base, to achieve a pH of greater than about 7.5 and to keep the resin solubilized or dispersed. The coating can be used, for example, as an overcoat or overprint varnish for inks on packaging materials or other coating cases where heat resistance is desirable.

Heat resistant coatings have particular applicability to the field of graphic arts and packaging. Heat resistant polymer coatings are used as overcoats or overprint varnishes for inks on packaging materials. Paper goods such as paper plates and cups employed for hot foods also require heat resistant coatings.

In the manufacture of graphic arts products and paper goods, one process involves the printing of the graphic materials on a substrate and combining the printed material with structural materials, such as corrugated backing to form a package or other useful structure. The laminating process which is used to attach the structural layers usually involves high temperatures for the bonding process. It is in applications such as these where the coating polymer should have good heat resistance properties to avoid damaging the printed materials. In addition, other characteristics of the polymer, which would be important if it is used as an overcoat, include the water-resistance of the polymer, the skid angle of the coating and the gloss of the coating since these are important to the appearance of the printed matter.

Materials are known for use as heat resistant coating compositions, but frequently they suffer from disadvantages in the balance of their properties. Conversely the materials may provide good coating properties, but suffer from poor heat resistance. For example, in U.S. Pat. No. 4,358,573, there is disclosed a method for solubilizing a terpolymer of maleic anhydride and mixtures of lower and higher alkenes employing an aqueous solution of ammonium hydroxide to form a coating polymer. However, the films formed from such polymers lack enhanced heat resistance and become tacky during storage and use. U.S. Pat. Nos. 4,623,692 and 4,730,019 disclose a coating composition having improved heat resistance which employs a combination ligand-free monomer and maleic anhydride polymer with an effective mount of a metal ion-containing fugitive ligand complex solubilized in an aqueous medium. In the presence of heat, the metal ion will effectively crosslink the polymer and provide the heat resistance desirable in the polymer. But, the preferred metal ion is zinc and there has been some resistance to having the zinc ion present in the packaging coatings.

A commercially available material which is suggested for use as a clear over-varnish and as a general purpose ink resin is sold by Rohm and Haas Company under the tradename Emulsion E-2183. It is described as an acrylic aqueous polymer useful where the underlying inks must be protected from heat during subsequent converting steps. It is believed to be a blended polymer of an acrylate latex and a maleic anhydride copolymer in a ratio of 40:60 parts of latex to parts of maleic anhydride copolymer, having an acid value of about 150 and a particle size of between about 180 to 230 nanometers (nm) or 1800 to 2300 angstroms (A°).

SUMMARY OF THE INVENTION

The present invention has resulted from the discovery that a heat-resistant coating composition having a good balance of other properties, including water resistance, skid angle, and gloss, can be achieved by employing a composition which is a combination of a water soluble or dispersible resin containing a sufficient number of either (a) carboxyl groups or (b) carboxyl and amide groups and an aqueous latex polymer emulsion, where the particle size of the latex polymer is less than 1600 Angstroms and the emulsion polymer contains an effective amount of nitrogen-containing volatile base to achieve a pH of greater than 7.5 and to keep the resin solubilized or dispersed. The preferred resin is a maleic anhydride copolymer and the preferred latex polymer is a (meth)acrylate polymer or copolymer. The weight ratio of resin to latex polymer emulsion is between 50–95:50–5, with the range 60–80:40–20 being preferred, and the ratio 65:35 being further preferred.

DETAILED DESCRIPTION

In the present invention the coating composition is produced preferably by polymerizing the latex polymer in the presence of the water-soluble or water-dispersible resin. This results in a composition which contains a carboxyl-containing (optionally also amide-containing) resin and a latex polymer emulsion having a particle size of less than about 1600 Angstroms or A° (or 160 nanometers or nm), preferable less than 150 nm, with less than 100 nm being further preferred.

There is nothing critical in the latex polymerization process and so it can be done in a typical process such as for example that disclosed in U.S. Pat. No 4,956,434, the teachings of which are incorporated herein by reference. Although, other latex processes could be employed. By polymerizing the latex in the presence of the carboxyl containing resin, the use of surfactants can be minimized or eliminated, a latex product is produced having an average particle size of less than about 160 nm and the result is a coating having a good balance of properties.

It is important that the overall aqueous system contains an effective amount of a nitrogen containing volatile base, such as ammonia, an amine, or other volatile base to achieve a pH of greater than 7.5 and to keep the resin solubilized or dispersed. Ammonia is the preferred volatile base, but the following amines could be employed:

2-amino-2-methyl propanol
diethanolamine
diethylamine
diethylethanolamine
diisopropanolamine
dimethylethanolamine
ethanolamine
ethylene diamine
morpholine
n-propylamine
triethanolamine
triethylamine triisopropanolamine
trimethylamine The carboxyl containing resin is a water soluble or water dispersible resin which contains a sufficient number of either carboxyl groups or carboxyl groups and amide groups so that in the presence of heat, anhydride rings or imides will form and water will be given off to provide the coating with improved heat resistance. The preferred carboxyl-containing resin is a maleic anhydride (MA) copolymer, preferable with styrene. Other maleic anhydride copolymers can be employed, such as MA with diisobutylene or with methyl vinyl ether. Examples of other carboxyl containing polymers include (meth)acrylic acid, itaconic acid, or fumaric acid or combinations of these carboxylic acids polymerized with styrene and/or alpha methyl styrene and polymers and copolymers of (meth)acrylic acid and amides, such as acrylamide, t-octyl acrylamide, t-butyl acrylamide, and/or acrylates, such as isobutyl, n-butyl-, or stearyl-(meth) acrylate. Alternatively, blends of carboxyl-containing resins could be employed.

The latex polymer emulsion can be prepared from a variety of monomers, including (meth)acrylate monomers. The proportions of the various monomers are adjusted to yield polymers with glass transition temperatures (Tg) of less than or equal to 50° C.

(Meth)acrylate monomers include methyl acrylate, ethyl acrylate, propyl acrylate(s), butyl acrylate(s), 2-ethylhexyl acrylate, n-octyl acrylate, methyl (meth)acrylate, butyl (meth)acrylate, octyl (meth)acrylate, and the like. The (meth)acrylate monomers can be polymerized together, or with other monomers including the conjugated dienes such as butadiene and isoprene; α-olefins such as ethylene, propylene and isobutylene; vinyl halides such as vinyl fluoride, vinyl chloride and vinylidene chloride; vinyl esters such as vinyl acetate; vinyl aromatics such as styrene, α-methyl styrene; vinyl toluene and vinyl naphthalene; alkyl vinyl ethers such as methyl vinyl ether, propyl vinyl ether, and the like.

In addition to polymers which include (meth)acrylate monomers and the above monomers, a large variety of other copolymers of the above monomers are possible, including styrene with one or more of the dienes, e.g. butadiene, vinyl acetate or other vinyl esters with vinyl chloride, and the like.

All the various possible latexes listed above may also contain minor amounts (less than about 25%) of functional monomers such as acrylic acid, methacrylic acid, acrylamide, methacrylamide, acrylonitrile, N-methylol acrylamide and the like.

In addition, combinations or blends of latex polymers or copolymers can be used with (meth)acrylate latexes being preferred. A further preferred latex is butyl methacrylate copolymerized with 2-ethylhexyl acrylate and styrene, although the styrene is optional. Other (meth)acrylate latexes to be used include lauryl(meth)acrylate. Other combinations of latex polymers can be employed, so long as the latex has a Tg of 50° C. or less.

The ratio of carboxyl containing resin to latex polymer emulsion will be in the range of 50 to 95 parts per hundred resin (phr) of carboxyl-containing resins to 50 to 5 phr of latex polymer emulsion with a 60–80 to 40–20 range being further preferred, and a 65:35 ratio being preferred.

Thus, preferred composition comprises 65% by weight (solids content) or parts per hundred resin (phr) of the water-soluble or water-dispersible resin and 35% by weight (solids content), or phr, of the latex polymer, with the preferred latex polymer being a (meth)acrylate polymer containing butyl methylacrylate, 2-ethyl hexyl acrylate, and styrene.

TYPICAL EXAMPLE

Into a 4-neck, three liter glass resin kettle equipped with a stirrer, condenser, thermocouple and gas inlet tube was added 65 parts by weight of a styrene maleic anhydride resin, such as SMA 1000 resin which is commercially available from ELF Atochem North America, Inc., along with the water in which it is dissolved. Another 27 parts of demineralized water is added. Good stirring is maintained throughout the procedure. The pH is adjusted to 9.0 with ammonia. The reactor is closed and a water-cooled condenser is attached. The reactor contents are then heated to the initiation temperature of 85° C. Next, an initiator solution of 1.0 parts by weight of ammonium persulfate and 2.06 parts of demineralized water is prepared. Once the temperature of the reactor contents reaches the initiation temperature, the initiator solution is added to the reactor contents. Approximately 5 minutes after the initiator solution is added, a premix solution of 24.5 parts of butylmethacrylate, 0.35 parts of styrene and 10.15 parts of 2-ethylhexyl acrylate, is metered into the reactor contents over approximately a 3 hour period. The exact time is not critical. The key factor is to meter at a rate so that the heat evolved can be controlled and prevent the reactor contents from overheating. Next, a "booster" initiator solution is prepared from 0.1 part of ammonium persulfate and 1.18 parts of demineralized water and pumped into the reactor. The mixing is continued for an additional period of time, approximately 1 hour or more. After the booster initiator step has been completed, a typical redox procedure is followed or alternatively, the mixing and heating can be continued for approximately an additional hour, and the latex is ready for packaging and application.

In testing the overprint varnish, the polymer emulsion is compounded with polyethylene wax emulsion, commercially available as Michem Emulsion 39235, and water. The compound viscosity is measured using a #2 Zahn cup. For most practical purposes, the viscosity should be adjusted by water addition to 25–35 seconds as measured using a #2 Zahn cup. The addition of wax emulsion and the adjustment of compound viscosity are general procedures used by the industry.

A No. 4 wire-wound rod, or a Pamarco Flexo Hand Proofer was used to apply the overprint varnish onto solid bleached sulfate (SBS) paperboard which comes pre-coated with a general pigmented paper coating. After coating, the overprint varnish is dried at 350° F. for 1 minute and then tested for gloss, skid angle, and water resistance. For the heat resistance test, the coating is dried at 220° F. for 15 seconds.

Heat Resistance

In order to evaluate the heat resistance of the varnish, a 400° F. hot iron was applied to the coating surface. This is done, for example, by placing the iron in contact with the surface of the coated paperboard and moving it across the coating surface. To provide good heat resistance, the coating surface should not be damaged and gloss should not be affected. The heat resistance is a visual observation rated from 1 to 8, with 1 being the highest.

Gloss

The gloss is measured in accordance with ASTM D-523, which is incorporated herein by reference, by placing the coated material under a gloss meter, such as a Byk Chemie Gloss Unit Type 4031/4343, and measuring the gloss at a 60° angle and an 85° angle. Gloss readings will be a number which will range from 0 to more than 100, with the higher number being higher gloss. For the applications discussed herein, a higher gloss is preferred.

Skid Angle

In this procedure, two coated paperboards are placed in face-to-face relationship, with the coated surfaces in contact. To one of the paperboards is attached a standard weight by wrapping the paperboard around the weight. The skid angle is measured using a TMI (Testing Machines Inc.) coefficient of friction tester, Model No. 32-25. The machine consists of an inclined plane, whose angle can be varied by a motor and gear assembly, and a sliding weight. One piece of the test specimen is clamped onto the inclined plane. Another piece is clamped around the sliding weight. The incline of the plane is then increased until the weight just starts to slide, at which point the plane is locked and the angle is noted. A high skid angle is desirable. A skid angle of greater than 25° is preferred.

Water Resistance

The coated surfaces were tested for wet blocking resistance to determine the water resistance. In the wet blocking test, two pieces of 5×5 inches of coated SBS paperboard were placed together, with coated sides facing each other. Ten drops of water were placed between them. A 70 pound load was applied for one hour. The coated surfaces should not stick together and should not be damaged.

In addition, particle sizes were run using the standard operating procedure for a Brookhaven Instruments Corp. Particle Sizer, Model BI-90. The acid value, which is the milligrams of potassium hydroxide needed to neutralize one gram of resin and latex solids also were obtained for the polymers.

Following the typical example, a series of coatings were made and tested. The process of the typical example was followed except where noted such as Example 1D, which is a commercially available product and Example 2 which is a blended product which is similar to Example 1D. The results are set forth in Table I. The compositions are noted in the Table and the following terms are used to describe the resins and/or latex polymers:

SMA-1000 is the tradename of ELF Atochem North America, Inc. for a copolymer of styrene and maleic anhydride having a ratio of styrene to maleic anhydride of 1:1.

SMA-2000 is the tradename of ELF Atochem North America, Inc. for a

| Example No. | Polymer Carboxyl Polymer (Phr) | Latex Polymer (Phr) | Ratio CP:LP | Particle Size | Acid Value | Heat Resistance | Skid Angle° | Water Resistance | Gloss 60° | 85° |
|---|---|---|---|---|---|---|---|---|---|---|
| 1A | SMA 1000 (65) | 24.5 BMA 10.2 EHA 0.4 STY | 65:35 | 66 | 312 | 1 | 27.5 | P | 69.0 | 75.7 |
| B | Tamol 165 (65) | 24.5 BMA 10.2 EHA 0.4 STY | 65:35 | 149 | 169 | 1 | 28.0 | P | 58.4 | 82.3 |
| C | Gantrez AN 119 (65) | 24.5 BMA 10.2 EHA 0.4 STY | 65:35 | 874 | — | 1 | 23.0 | F | 51.8 | 74.7 |
| D | E-2183 | — | — | 180 | 170 | 1 | 32.3 | P | 56.2 | 76.8 |
| 2* | SMA 1000 (65) | 24.5 BMA 10.2 EHA 0.4 STY | 65:35 | 280 | 312 | 1 | 28.8 | P | 40.1 | 52.3 |
| 3A | 32.5 SMA 1000 25.0 SMA 2000 | 24.7 EHA 17.8 STY | 57.5:42.5 | 78 | 244 | 5 | 30.5 | P | 61.2 | 84.8 |
| B | 32.5 SMA 1000 25.0 SMA 2000 | 18.7 EHA 28.8 STY | 57.5:42.5 | 67 | 244 | 6 | 29.5 | P | 59.8 | 85.0 |
| 4A | 19.5 SMA 1000 35 SMA 2000 | 32.7 BMA 12.2 EHA | 54.5:44.9 | 69 | 216 | 6 | 26.0 | P | 54.2 | 81.8 |
| B | 45 SMA 1000 15 SMA 200 | 32.7 BMA 12.2 EHA | 60:40 | 75 | 271 | 1 | 24.5 | P | 62.7 | 87.0 |
| C | 32.5 SMA 1000 25 SMA 2000 | 30.5 BMA 12 EHA | 57.5:42.5 | 72 | 244 | 3 | 25.0 | P | 57.4 | 84.1 |
| 5A | 37.5 SMA 2000 25 Tamol 165 | 27 BMA 10.5 EHA | 62.5:37.5 | 64 | 198 | 1 | 27.0 | P | 50.9 | 77.0 |
| B | 37.5 SMA 2000 25 SMA 1000 | 27 BMA 10.5 EHA | 62.5:37.5 | 64 | 251 | 1 | 26.5 | P | 49.6 | 73.2 |
| C | 62.5 SMA 2000 | 27 BMA 10.5 EHA | 62.5:37.5 | 64 | 219 | 1 | 31.3 | P | 50.2 | 74.0 |
| D | 25 SMA 2000 32.5 SMA 1000 | 30.5 BMA 12 EHA | 57.5:42.5 | 80 | 244 | 3 | 29.5 | P | 58.4 | 83.5 |
| 6A | 30 SMA 1000 30 SMA 2000 | 28.8 BMA 11.2 EHA | 60:40 | 87 | 249 | 3 | 27.8 | P | 60.0 | 84.5 |
| B | 60 SMA 1000 | 28.8 BMA 11.2 EHA | 60:40 | 70 | 288 | 5 | 29.5 | P | 62.6 | 86.1 |
| C | 60 SMA 2000 | 28.8 BMA 11.2 EHA | 60:40 | 58 | 210 | 3 | 31.3 | P | 46.6 | 71.4 |
| 7A | 32.5 SMA 1000 25.0 SMA 2000 | 30.6 BMA 11.9 EHA | 57.5:42.5 | 76 | 244 | 6 | 30.0 | P | 56.0 | 78.8 |
| B | 32.5 SMA 1000 25.0 SMA 2000 | 42.5 LMA | 57.5:42.5 | 166 | 244 | 1 | 23.0 | P | 50.9 | 79.9 |
| 8A | 65.0 SMA 1000 | 30.5 BMA 4.5 EHA | 65:35 | 71 | 312 | 1 | 28.8 | P | 68.2 | 89.0 |
| B | 65.0 SMA 1000 | 20.0 BMA | 65:35 | 68 | 312 | 1 | 24.0 | P | 65.5 | 86.1 |

-continued

| Example No. | Carboxyl Polymer (Phr) | Latex Polymer (Phr) | Ratio CP:LP | Particle Size | Acid Value | Heat Resistance | Skid Angle° | Water Resistance | Gloss 60° | Gloss 85° |
|---|---|---|---|---|---|---|---|---|---|---|
| 9A | 65.0 SMA 1000 | 15.0 EHA 25.2 BMA | 65:35 | 69 | 312 | 2 | 25.5 | P | 66.5 | 88.0 |
| B | 65.0 SMA 1000 | 9.8 EHA 14.0 BMA | 65:35 | 71 | 312 | 1 | 20.5 | P | 65.2 | 85.8 |
| C | 45 MAA 30 STY 25 AMS | 21.0 EHA 16.7 BMA 23.3 EHA | 60:40 | 55 | 161 | 3 | 24.8 | P | 48.8 | 75.4 |
| 10 | 65.0 SMA 1000 | 35 BMA | 65:35 | 71 | 312 | 2 | 26.7 | P | 61.2 | 87.0 |
| 11 | 45 MAA 15 STY 40 AMS | 23.3 EHA 16.7 STY | 60:40 | 87 | 191 | 2 | 29.0 | P | 53.5 | 81.1 |
| 12A | 45 MAA 30 STY 25 MMA | 28.8 BMA 11.2 EHA | 60:40 | 74 | 153 | 5 | 26.0 | P | 50.1 | 80.2 |
| B | 55 MAA 25 STY 20 AMS | 28.8 BMA 11.2 EHA | 60:40 | 82 | 191 | 3 | 27.5 | P | 55.6 | 83.0 |

\* = BLENDED POLYMER copolymer of styrene and maleic anhydride having a ratio of styrene to maleic anhydride of 2:1.

Tamol-165 is the tradename of Rohm & Haas Company for a copolymer of maleic anhydride and diisobutylene.

Gantrez AN-119 is the tradename for a copolymer of maleic anhydride and methyl vinyl ether available from ISP, Inc.

E-2183 is the tradename of Rohm & Haas for an acrylic aqueous polymer used as a clear over-varnish.

BMA means butyl (meth)acrylate

EHA means 2-ethyl hexyl acrylate

STY means styrene

LMA means lauryl methacrylate

MAA means methacrylic acid

AMS means alpha methyl styrene

MMA means methyl methacrylate

Further, in the examples a sample of E-2183 was run as a control to aid evaluation of the results. But, each control result is not reported as it is in Example ID. Instead, it is noted that for all the tests, the E-2183 coating resulted in a heat resistance value which ranged from 1 to 3 and averaged 1.3; a skid angle which ranged from 25.5° to 33.3°, or an average of 28.4°; a 60° gloss varying from 49.9 to 56.2, with an average of 52.2; an 85° gloss which ranged from 76.8 to 83.5 or an average of 81.2; and a water resistance which was acceptable (or passed) in all cases.

As can be seen from the examples, a variety of carboxyl containing resins can be employed, a variety of latex polymers can be employed, and a favorable balance of properties, for example, skid angle, water resistance, and gloss can be obtained in a coating having a good heat resistance when the coating has a latex polymer having an particle size of less than 160 nm.

For example, as seen in Examples 1A versus 1D, a commercially available product, the coating of the present invention had comparable heat resistance, but higher gloss readings since the 60° gloss reading was significantly higher and the 85° gloss readings were about the same. Examples 8,9, and 10 further show that coatings of the present invention achieve high gloss values in addition to heat resistance. Examples 10, 8A, 9A, 8B and 9B show that with the same carboxyl polymer, in the same amount, varying the ratio of BMA to EHA will produce a progressively lower skid angle until a less than desirable, less than 25° angle is achieved. Examples 3-12 demonstrate that various carboxyl-containing polymers or resins can be employed, but that it is desirable to use more than 58% by weight carboxyl polymer, preferably more than 60% by weight. Further, examples 3-8 support the belief that, although the performance of the resin is probably attributable to a combination of sufficient carboxyl groups and their placement, a sufficiently high acid value, e.g. greater than 250, can be a factor in the performance of the carboxyl-containing polymer. Thus carboxyl polymer content or acid value or combinations of these factors influence the performance of the coating. Various latex polymers can be employed and still achieve a good balance of properties.

The foregoing embodiments of the present invention have been presented for purposes of illustration and description. This description and these embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize this invention in its various embodiments and with various modifications as are suited to the particular use contemplated. It is intended that the invention be defined by the following claims:

What we claim is:

1. A heat resistant coating composition having improved properties comprising 5 to less than 42 parts by weight of an aqueous latex polymer and more than 58 to 95 parts by weight of a water-soluble or water-dispersible resin, based upon 100 parts by weight of both the latex polymer and the water-soluble or water-dispersible resin, which water-soluble or water-dispersible resin is selected from the group consisting of a copolymer of maleic acid or anhydride with a monomer selected from the group consisting of styrene, methyl vinyl ether, (meth)acrylic acid, alpha methyl styrene, and combinations thereof, a copolymer of (meth)acrylic acid and styrene or alpha methyl styrene, and a copolymer of (meth)acrylic acid and an amide containing a vinyl group, and contains a sufficient number of either (a) carboxyl groups or (b) carboxyl and amide groups such that at least one anhydride ring or imide, respectively, will form in the presence of sufficient heat and release water to provide the coating with heat resistance, said latex polymer having a particle size of less than 1000 Angstroms and containing an effective mount of nitrogen-containing volatile base whereby the pH is greater than about 7.5, wherein said latex polymer is made by polymerizing latex monomers in the presence of said water-soluble or water-dispersible resin, and said coating composition provides heat resistance and a 60" gloss of greater than 58.4, as measured in accordance with ASTM Standard D-523.

2. The composition of claim 1 wherein said latex polymer is a (meth)acrylate polymer.

3. The composition of claim 1 wherein said latex polymer is polymer of butyl methacrylate, 2-ethyl hexyl acrylate and styrene.

4. The composition of claim 1 wherein said latex polymer comprises, based on the 100 parts by weight of both the latex polymer and the water-soluble or water-dispersible resin:
10–30 parts by weight of butyl (meth)acrylate
5–25 parts by weight of 2-ethyl hexyl acrylate up to 5 parts by weight of styrene.

5. The composition of claim 1 wherein said latex is selected from the group consisting of acrylic, vinyl chloride, vinyl acetate, and diene latexes and copolymers thereof.

6. The composition of claim 1 wherein said coating composition comprises 35% by weight latex polymer and 65% by weight water-soluble or water-dispersible resin.

7. The composition of claim 1 wherein the coating has a skid angle of greater than 25°.

8. The composition of claim 1 wherein said latex polymer has a glass transition temperature of 50° C. or less.

* * * * *

UNITED STATES PATENT AND TRADEMARK OFFICE
CERTIFICATE OF CORRECTION

PATENT NO.  : 5,705,554
DATED       : January 6, 1998
INVENTOR(S) : Ti Chou et al.

It is certified that error appears in the above-identified patent and that said Letters Patent is hereby corrected as shown below:

Claim 1, column 9, line 7, change "mount" to read --amount--.

Claim 1, column 9, line 12, change "60"" to read --60°--.

Claim 4, column 10, lines 5 and 6, change

"5-25 parts by weight of 2-ethyl hexyl acrylate up to 5 parts by weight of styrene."

to read

--5-25 parts by weight of 2-ethyl hexyl acrylate
   up to 5 parts by weight of styrene.--

Signed and Sealed this

Nineteenth Day of May, 1998

Attest:

BRUCE LEHMAN

Attesting Officer        Commissioner of Patents and Trademarks